Patented Aug. 25, 1953

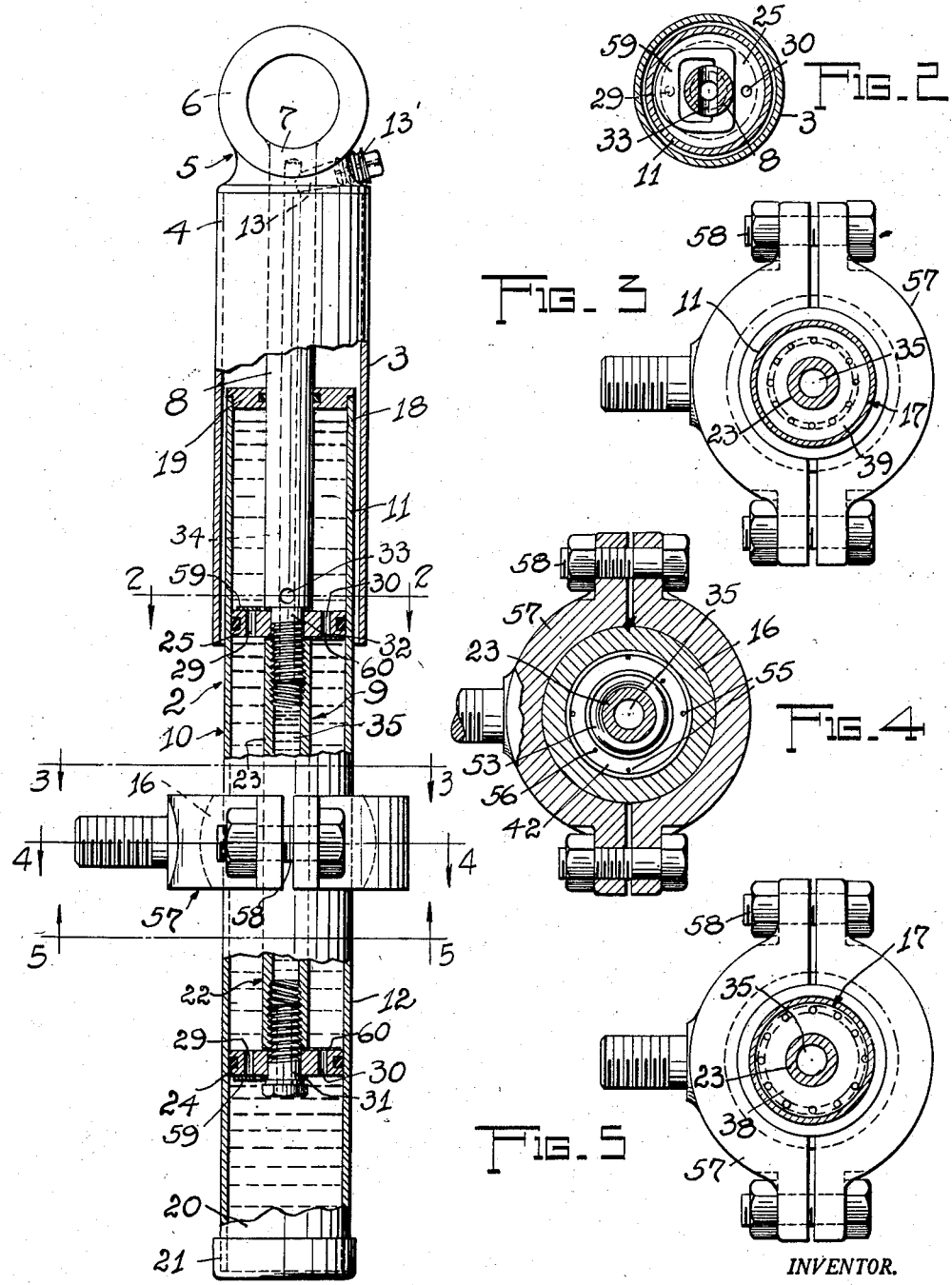

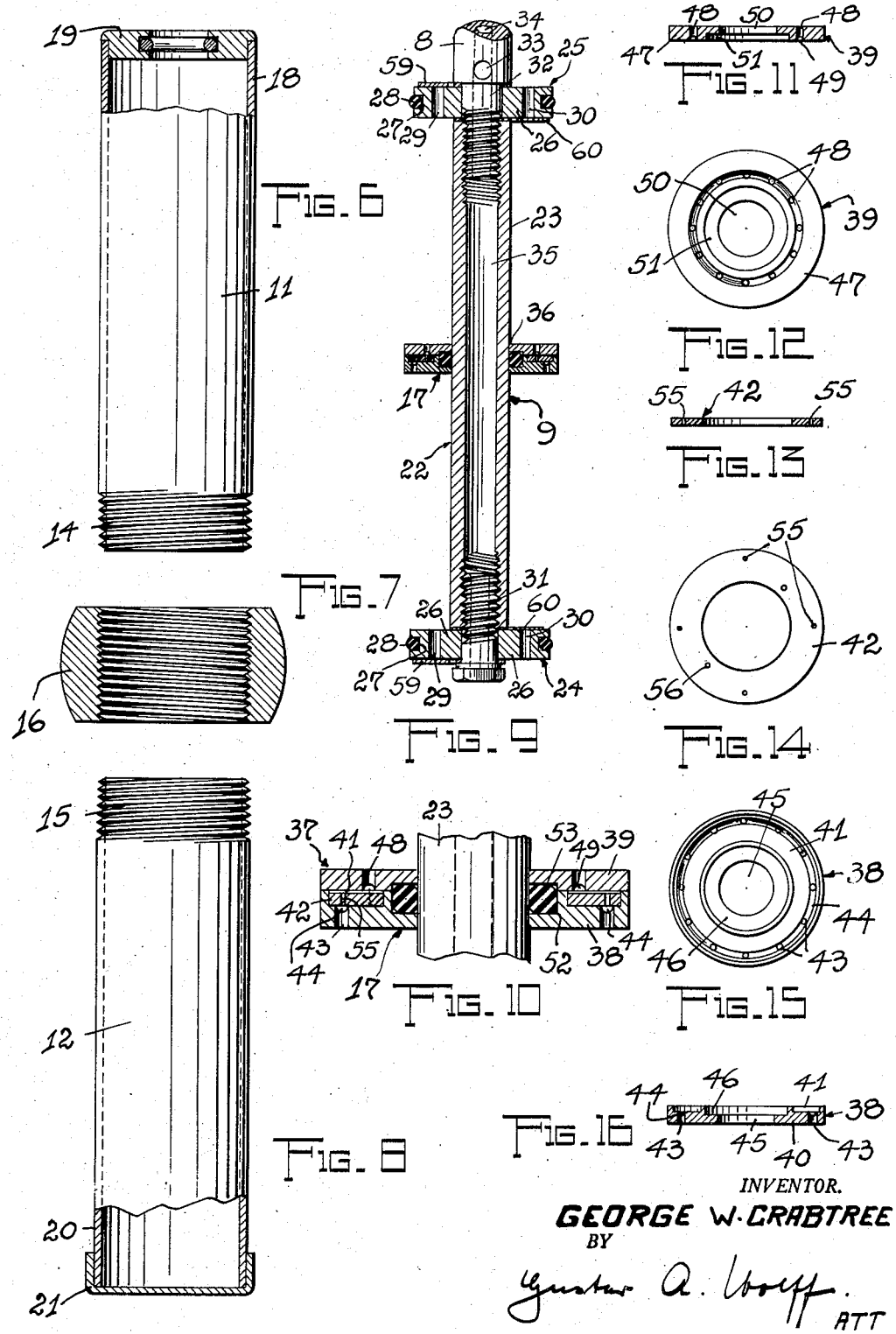

2,649,937

UNITED STATES PATENT OFFICE 2,649,937

HYDRAULIC SPRING CONTROL MEANS

George W. Crabtree, Cleveland Heights, Ohio

Application October 22, 1949, Serial No. 123,016

2 Claims. (Cl. 188—100)

The present invention relates in general to double-acting hydraulic spring controlling units of the directly actuated type which check and retard movements of vehicle springs under compression and their reflex actions under rebound by forcible displacement of liquid from one end of a working chamber to its other end and vice versa, and, which for proper efficiency should include means to automatically replace leakage liquid from the working chamber to prevent air and vapor bubbles from being formed in such working chamber.

The general object of the invention is the provision of a double-acting hydraulic spring controlling unit of the type referred to constructed to substantially eliminate all common leakage, the hydraulic spring controlling unit embodying a liquid-filled working chamber consisting of two axially aligned, rigidly connected cylinders which communicate with each other through a passaged member arranged between said cylinders in axial alignment therewith; and a piston device consisting of a rigid tubular axial member rigidly supporting spaced pistons for the two respective cylinders, an arrangement by which liquid displaced for shock absorbing purposes is shifted under pressure from one cylinder through the passage member to the other cylinder and liquid displaced to permit traveling of the pistons in said cylinders is shifted with practically no resistance from the respective cylinder through the tubular axial member of the piston device to the other cylinder.

Another object of the invention is the provision of a double-acting hydraulic spring controlling unit of the type described above in which the pistons of the piston device include means to automatically feed liquid into the portions of the cylinder positioned adjacent to the passaged member to keep these pressure-actuated portions of the cylinders properly filled and prevent under all conditions forming of air and vapor bubbles in liquid to be forcibly displaced.

Further objects and novel features of the invention by which the above and other desirable objects and superiorities are attained are clearly set forth in the following specification and the appended claims; and a preferred form of embodiment of the invention is hereinafter shown with reference to the accompanying drawings forming part of the specification.

In the drawings:

Fig. 1 is a sectional view, partly in elevation, showing a double-acting hydraulic spring controlling unit constructed in accordance with the invention;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1; and

Fig. 5 is a cross-sectional view taken on line 5—5 of Fig. 1;

Fig. 6 is a side view partly in section of one of the cylinders;

Fig. 7 is a sectional view through the member axially connecting the cylinders with each other; and Fig. 8 is a side view partly in section of the other one of the cylinders;

Fig. 9 is a longitudinal sectional view through the piston device and the passaged member which effects restricted communication between the axially aligned cylinders;

Fig. 10 is an enlarged sectional view through the passaged member;

Figs. 11 through 16 show the individual parts of the passaged member thus;

Fig. 11 is a sectional view through the housing top portion of the passaged member, and Fig. 12 a bottom view of said housing top portion;

Fig. 13 is a sectional view of the valve arranged within the passaged member, and Fig. 14 is a bottom view of said valve, and Fig. 15 is a plan view of the housing base portion of the passaged member, and Fig. 16 a sectional view through said housing base portion.

Referring now in detail to the exemplified form of the invention shown in the drawings, numeral 2 denotes a double-acting hydraulic spring controlling unit which includes a tubular shielding sleeve 3 closed at its upper end 4 by head 5 provided with a ring 6. Head 5 has secured thereto the end 7 of the piston rod 8 of a piston device 9 cooperating in shock-absorbing operations with a working chamber arrangement 10 having two cylinders 11 and 12. These cylinders have their threaded opposed ends 14 and 15, respectively, axially aligned and engaged with an internally threaded sleeve 16 which encircles and encloses a ring-shaped choking member 17 dimensioned to be engaged by the end faces of cylinder members 11 and 12 and to be tightly held thereby when the cylinders are screwed home into the internally threaded sleeve 16 to engage member 17. Cylinder 11 is closed at its upper end 18 by a ring-shaped plate 19 and cylinder 12 is closed at its lower end 20 by a cap 21. The two axially aligned cylinders 11 and 12 form the working chamber arrangement for piston device 9 which when oscillated effects shock absorbing actions by forcibly shifting liquid from one cylinder through passaged member 17 into the other one of said cylinders, and vice versa.

For such action the piston device 9 embodies a piston couple 22 consisting of a tubular rod 23 mounting on its opposite ends pistons 24 and 25. Piston 24 which consists of a channel disk 26 mounting in its circumferential channel 27 a rubber ring 28 and including valve controlled passages 29 and 30, is secured to tubular rod 23 by a tubular screw member 31, and piston 25 which is constructed similar to piston 24 is secured to the tubular rod 23 by a reduced, threaded and axially perforated end portion 32 of piston rod 8 which has a cross bore 33 intersecting its axial bore 34 and thus permits open communication with the axial passage 35 in tubular rod 23. The axial bore of piston rod 8 permits filling of the spring controlling unit through a passage 13 closed by a breather plug 13'.

The thus constructed piston couple 22 is dimensioned to position its pistons 24 and 25 in cylinders 12 and 11, respectively, and the central opening 36 in ring-shaped member 17 is dimensioned to slidably fit tubular rod 23, all for the purpose of permitting relative movements between the working chamber arrangement and the piston couple necessary for shock absorbing actions as will be later described.

The ring-shaped member 17 which affords communication between cylinders 11 and 12 is a choking member embodying a ring-shaped housing 37 assembled from a ring-shaped base portion 38 and ring-shaped top portion 39. The base portion 38 (see Figs. 10, 15 and 16) embodies a ring-shaped disk 40, the top portion of which is recessed to form said disk with a circular channel 41 (adapted to seat a valve disk 42 as will be later described), and the bottom portion of which includes a plurality of bores 43 equally spaced from the center of disk 40 so as to intersect groove 44 in circular channel 41. In addition ring-shaped base portion 38 has a circular area adjacent to its axial bore 45 recessed as at 46 to form part of a sealing chamber as will be later described.

The top portion 39 of ring-shaped housing 37 consists of a ring-shaped disk 47 which includes a plurality of bores 48 equally spaced from the center of said disk so as to intersect a circular groove 49 in the bottom face of said disk 47. In addition ring-shaped disk 47 has its bottom face in a circular area adjacent to its axial bore 50 recessed as at 51. The circular recess 46 in disk 40 and the circular recess 51 in disk 47 provide housing 37 with a sealing chamber 52 which seats a sealing ring 53 effecting slidable, fluid-tightly sealed extension of tubular rod 23 through the bores 45 and 50 of the respective base and top portions 38 and 39 of housing 37.

The thus constructed housing slightly-shiftably mounts in its ring-shaped chamber, formed by the circular channel 41, the ring-shaped valve disk 42 which is provided with four choking perforations 55 spaced from the center of the valve disk a distance equal to the radius of circular groove 44 and two choking perforations 56 spaced from the center of the valve disk a distance equal to the radius of circular groove 49 to permit proportionate shock-absorbing action of the hydraulic spring controlling unit as will be later described.

The hydraulic spring controlling unit is attached to the frame and axle of an automobile by head 5 and a bracket member 57 universally adjustably mounted on sleeve 16 and rigidly secured thereto by clamping bolts 58 so that relative movements between the frame and axle effects shifting of the piston couple 22 in cylinders 11 and 12. When the piston couple travels downwardly, piston 25 in cylinder 11 forcibly and under pressure forces liquid from cylinder 11 through the passaged member 17 into cylinder 12, and piston 24 in cylinder 12 shifts liquid from cylinder 12 unimpeded through communicating axial passage 35 in tubular rod 23 into cylinder 11. In this action, the liquid under pressure, shifting the valve disk 42 in channel 41 downwardly, can be forced into cylinder 12 only through the four perforations 55, the two perforations 56 of said valve disk being shut off in this position of valve disk 42. When the piston couple travels upwardly, in the opposite direction, then piston 24 in cylinder 12 forcibly and under pressure forces liquid from cylinder 12 through the passage member 17 into cylinder 11, and piston 25 in cylinder 11 shifts liquid from cylinder 11 unimpeded through communicating axial passage 35 in tubular rod 23 into cylinder 12. In this action the liquid under pressure, shifting the valve disk 42 in channel 41 upwardly, can be forced into cylinder 11 only through the two perforations 56 of the valve disk 42, therefore, the choking action of passaged member 17 differentiates on the up and down stroke of the piston couple.

Hydraulic spring controlling units of the type described practically eliminate leakage of liquid from their cylinders, as liquid under pressure is present only in the inner opposed portions of the cylinders, whereas the liquid in the outer end portions thereof is under atmospheric pressure and readily and unimpededly displaceable from one of these outer end portions of the cylinders to the other one thereof.

Excessive choking action or breakage of the hydraulic spring controlling units under excessive compression strain is avoided by valve controlled relief passages 29 in pistons 24 and 25, which passages are closed by valve elements 59 of sufficient stiffness to avoid under normal conditions escape of liquid from the active portions of the cylinders; and leakage of liquids from these active portions of the cylinders is counteracted by valve controlled passages 30 which are normally closed by valve elements 60 designed to readily permit communication of the active portions of the cylinders with the other portions thereof to automatically keep the active portions of the cylinders properly filled with liquid.

Having thus described my invention what I claim is:

1. A choking valve member for double-acting spring controlling units mounting in a cylinder piston couple means with pistons connected by an elongated piston rod, said valve member including a housing with a ring-shaped valve chamber having inlet passages equally spaced from the axis of the chamber and outlet passages equally spaced from said axis a distance different from the distance of the inlet passages from such axis, and a ring-shaped valve member shiftably arranged in the chamber of said housing adapted to be sleeved upon the piston rod of said piston couple means, said valve member including choking passages in communication with said inlet passages and choking passages in communication with said outlet passages.

2. A choking valve member as described in claim 1, wherein the combined cross-section of the choking passages in communication with said inlet passages differentiates from the combined cross section of the choking passages in communication with said outlet passages.

GEORGE W. CRABTREE.

References Cited in the file of this patent

UNITED STATES PATENTS

| Number | Name | Date |
|---|---|---|
| 1,164,371 | Lovejoy | Dec. 14, 1915 |
| 1,205,484 | Roper | Nov. 21, 1916 |
| 1,281,079 | Sears | Oct. 8, 1918 |
| 2,029,829 | Messier | Feb. 4, 1936 |
| 2,296,732 | Oyston et al. | Sept. 22, 1942 |
| 2,473,043 | Whister, Jr. | June 14, 1949 |

FOREIGN PATENTS

| Number | Country | Date |
|---|---|---|
| 353,087 | France | Sept. 1, 1905 |